UNITED STATES PATENT OFFICE 2,322,273

PROCESS FOR MANUFACTURE OF ESTERS OF MONONITRILES OF DICARBOXYLIC ACIDS

Burnard S. Biggs, Summit, N. J., assignor to Bell Telephone Laboratories, Incorporated, New York, N. Y., a corporation of New York No Drawing. Application November 22, 1940, Serial No. 366,723

6 Claims. (Cl. 260—464)

This invention relates to the art of preparing esters of cyano organic acids or, as they may be termed, esters of mononitriles of dicarboxylic acids.

An object of the present invention is to provide a process for the production of such a substance which is simple, which does not involve critical reacting conditions, which is economical, and which provides large yields. This and other objects of the invention will be apparent from the following discussion.

The present invention provides a process for the production of such a substance involving the hydrolysis and esterification of one of the nitrile groups of a dinitrile of a suitable dicarboxylic acid. According to the present invention both the hydrolysis and esterification are performed in a single operation.

Various types of esters, such as the alkyl, aryl and aralkyl esters of various kinds of cyano organic acids, such as alkyl, aryl, and aralkyl cyano acids may be readily produced according to the present invention. It is, however, preferable that monohydroxy alcohols only be employed in the production of esters according to the present invention, since the employment of polyhydroxy alcohols may result in the formation of undesirable cyclic compounds which may seriously diminish the yield of the desired mononitrile esters. Aside from this, the present invention makes possible the production of esters of cyano acids in which the cyano and carboxyl groups are either at or intermediate the ends of the molecule and in which the cyano and carboxyl groups may be separated by even a small number of atoms. The nature of the reaction or reactions involved in the present invention is such that cyclic compounds do not tend to form, as they often tend to form in other reactions, even though the functional groups are separated by only a small number of atoms.

While the present invention may be employed for the production of a wide variety of esters of the above indicated types, it lends itself particularly well to the production of lower alkyl esters of aliphatic cyano acids in which the cyano and carboxyl groups are at the opposite ends of the aliphatic chain.

According to the preferred mode of operation of the present invention, the hydrolysis and esterification of one of the cyano groups of a dinitrile of a dicarboxylic acid are performed in one operation. To this end, a suitable dinitrile may be dissolved in an excess of an alcohol which will produce the desired ester upon reaction with the carboxyl group of the acid. Water in an amount approximately that calculated to hydrolyze one cyano group of the quantity of the dinitrile employed is dissolved in the alcohol and a suitable acid is added. The purpose of the acid is primarily to act as a catalyst, although it also reacts with and neutralizes the ammonia formed as a result of the hydrolysis. It should be so chosen that it does not harmfully react with the other reactants or with the desired reaction product. In general non-oxidizing acids may be employed as catalysts. Sulphuric acid, p-toluene sulphonic acid, and hydrochloric acid are examples. Other types of catalysts aiding the esterification and hydrolysis reactions may be employed.

The solution is heated and preferably refluxed until formation of the desired ester ceases. Generally the time of heating is dependent upon the temperature, which should not be high enough to damage the reactants or the desired reaction product. In general, temperatures of from 60° C. to 150° C. are satisfactory. The desired ester of the mononitrile of the dicarboxylic acid may then be separated from the unchanged alcohol, dinitrile, diester, and other reaction products.

For convenience, but in no sense of limitation, the following illustrative example is presented of the production of 9-cyano-methyl-nononoate according to a method within the scope of the present invention.

One mol of dinitrile of sebacic acid is dissolved in an excess of methyl alcohol, one mol of water and one-half mol of sulfuric acid being added. The solution is heated and refluxed for about twenty-four hours, during which time the temperature is maintained at about 64° C. Apparently at least two pertinent reactions occur, one involving the formation of the cyano acid by hydrolysis of one of the cyano groups of the dinitrile and the other involving the esterification of such cyano acid. However, under the conditions indicated above, the two reactions pertinent to the production of the desired ester of the mononitrile probably occur concurrently and, hence, may be considered to be represented by the equation $$CN-(CH_2)_8-CN+H_2O+CH_3OH=$$
$$CN-(CH_2)_8-CO-O-CH_3+NH_3$$

The ammonia produced as a product of the reaction probably reacts with the sulphuric acid as well as with the alcohol to form salts, such as methyl ammonium sulphate $CH_3NH_4SO_4$. Other reactions also occur, such as hydrolysis of both

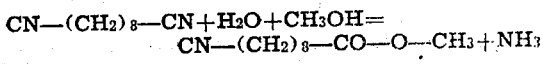

cyano groups to form a dicarboxylic acid and esterification of the carboxyl groups of such acid to form the diester.

At the end of the above-indicated period very little, if any, more of the methyl ester of 9-cyano-nonanoic acid will be formed upon further heating. The heating is, therefore, halted. At this stage, the solution comprises, besides the desired cyano acid ester, dimethyl sebacate, unchanged dinitrile and alcohol. The mixture of reaction products is then washed with water and with sodium carbonate solution which neutralizes any unconverted sulphuric acid and possibly other free acids by conversion into salts which, through differences in water solubility or other characteristics, may be readily removed from the reaction product mixture.

The solution including the desired methyl ester of 9-cyano-nonanoic acid and unchanged dinitrile of sebacic acid may be fractionally distilled with the recovery of a large fraction of practically pure 9-cyano-methyl-nonanoate and a remainder including the dinitrile of sebacic acid which may be reused. Yields of as high as 50 per cent of the calculated maximum yields of the 9-cyano-methyl-nonanoate are possible.

It appears that in the process of the present invention the reaction proceeds only as long as the active catalyst is present. In the above example, for instance, the sulphuric acid, although it reacts with the ammonia produced as a result of the hydrolysis of a cyano group of the dinitrile, acts primarily as a catalyst for the hydrolysis and esterification reactions. Consequently, when the free acid has all reacted, the reaction, or reactions, causing the production of the desired cyano acid ester halt. Therefore, it is necessary to employ more than just catalytic amounts of sulphuric acid, although it is undesirable to employ too large an excess of sulphuric acid.

By employing the proper amount of the acid catalyst it is possible to control the total extent of the hydrolysis and thus reduce the yield of the dimethyl ester, which is an undesirable by-product. Thus, it has been found that if for one mol of the dinitrile one mol of sulphuric acid is employed as a catalyst, one-half mol of the desired cyano acid ester, one-fourth mol of the diester, and one-fourth mol of unchanged dinitrile will result. It has been found that if, however, one-half mol of the sulphuric acid is employed with one mol of the dinitrile, the reaction product will include approximately 6.25 per cent of the diester, 37.5 per cent of the desired ester of the mononitrile, and 56.25 per cent of the unchanged dinitrile. Although in this case the yield of the desired ester is lower than that obtained when a larger proportion of sulphuric acid is employed, the larger proportion of unchanged dinitrile may be recycled to produce more of the desired product. The diester, on the other hand, which can not be recycled and, hence, represents a loss, is produced in a much smaller proportion than when a larger proportion of the sulphuric acid is employed. Thus, the use of a smaller amount of a catalyst results in a lesser degree of hydrolysis of both cyano groups of the dinitrile and, hence, in the production of a lesser amount of the undesired diester.

The 9-cyano-methyl-nonanoate which may be thus produced forms no part of the present invention, but is described and claimed in Patent 2,277,033 issued to W. S. Bishop.

The present invention thus provides a method of producing esters of cyano acids which is simple and involves no highly critical conditions; which provides large yields; and which employs inexpensive, readily obtainable reactants which do not present any unusual difficulties in handling. While esters of the type produced according to the present invention may be employed for various purposes, they may be particularly advantageously employed in the production of hydrocarbon alcohol-amines according to a process wherein they are hydrogenated, with the reduction of the cyano and the ester groups to amino and hydroxyl groups as described in copending application Serial No. 366,716, filed November 22, 1940 by W. S. Bishop.

It is apparent that various modifications may be made in the illustrative method described above and that other methods than that indicated may be employed which do not depart from the spirit of the present invention.

It is intended that the patent shall cover by suitable expression in the appended claims whatever features of patentable novelty reside in the invention.

What is claimed is:

1. The method of producing an ester of a mononitrile of an aliphatic dicarboxylic acid comprising in a single operation hydrolyzing one of the nitrile groups of the dinitrile of said acid and esterifying the hydrolytic product.

2. The method of producing an ester of a mononitrile of an aliphatic dicarboxylic acid comprising heating a solution of a dinitrile of said dicarboxylic acid, water, and an esterifying alcohol, in the presence of a catalyst reactive with a by-product of the reaction, at least one of said ingredients which is involved in the hydrolysis of said dinitrile being present in an amount less than that theoretically required to cause hydrolysis of both cyano groups of the amount of said dinitrile employed, said heating being continued until a substantial proportion of the ester of the mononitrile of said dicarboxylic acid is formed, and separating said ester from the mixture of unchanged reactants and other reaction products.

3. The method of producing an ester of a mononitrile of an aliphatic dicarboxylic acid comprising heating a solution of a dinitrile of said dicarboxylic acid, an esterifying alcohol, and water in approximately the amount theoretically necessary to hydrolyze one cyano group of the amount of dinitrile, said heating being continued until a substantial proportion of the ester of the mononitrile of said dicarboxylic acid is formed.

4. The method of producing an ester of a mononitrile of an aliphatic dicarboxylic acid comprising heating a solution of a dinitrile of said dicarboxylic acid, water and an esterifying alcohol, in the presence of an esterification catalyst, said heating being continued until a substantial proportion of the ester of the mononitrile of said dicarboxylic acid is formed, said catalyst being reactive with a by-product of said reaction and being present in an amount such that it is completely reacted before more than a small proportion of the diester of said dicarboxylic acid is formed.

5. The method of producing an ester of a mononitrile of an aliphatic dicarboxylic acid comprising heating a solution in an excess of an esterifying alcohol of a dinitrile of said dicarboxylic acid and water in approximately the amount theoretically necessary to hydrolize one cyano group of the amount of dinitrile, said heating being continued until a substantial proportion of the mononitrile of said dicarboxylic acid is formed, said heating being done in the presence of an esterification catalyst reactive with a by-product of said reaction and being present in an amount such that it is completely reacted before more than a small amount of the diester of said carboxylic acid is formed.

6. The method of producing an alkyl ester of a mononitrile of a dicarboxylic aliphatic acid comprising heating a solution of the dinitrile of said dicarboxylic acid, water, and an alkyl alcohol in the presence of an esterification catalyst until the ester of the mononitrile of said dicarboxylic acid is formed, and separating said ester from the mixture of unchanged reactants and other reaction products.

BURNARD S. BIGGS.